(12) United States Patent
Tonkin

(10) Patent No.: US 11,343,431 B2
(45) Date of Patent: May 24, 2022

(54) VEHICLE CAMERA TELEMETRY SYSTEM

(71) Applicant: THE TRAILER BUDDY PTY LTD, Shoreham (AU)

(72) Inventor: Bradley Tonkin, Maudsland (AU)

(73) Assignee: THE TRAILER BUDDY PTY LTD, Shoreham (AU)

( * ) Notice: Subject to any disclaimer, the term of this patent is extended or adjusted under 35 U.S.C. 154(b) by 0 days.

(21) Appl. No.: 15/734,487

(22) PCT Filed: Jun. 7, 2019

(86) PCT No.: PCT/AU2019/050595
§ 371 (c)(1),
(2) Date: Dec. 2, 2020

(87) PCT Pub. No.: WO2019/237147
PCT Pub. Date: Dec. 19, 2019

(65) Prior Publication Data
US 2021/0235019 A1 Jul. 29, 2021

(30) Foreign Application Priority Data
Jun. 12, 2018 (AU) ............................. 2018902097

(51) Int. Cl.
*H04N 5/232* (2006.01)
*G06T 7/50* (2017.01)
(Continued)

(52) U.S. Cl.
CPC ......... *H04N 5/23299* (2018.08); *B60D 1/245* (2013.01); *B60D 1/36* (2013.01);
(Continued)

(58) Field of Classification Search
None
See application file for complete search history.

(56) References Cited

U.S. PATENT DOCUMENTS 6,042,080 A * 3/2000 Shepherd ................ B60R 11/00
248/163.1
6,542,182 B1 * 4/2003 Chutorash ................ B60R 1/00
348/148
(Continued)

FOREIGN PATENT DOCUMENTS

JP 2017076833 A * 4/2017
JP 2017076833 A   4/2017

OTHER PUBLICATIONS

International Preliminary Report on Patentability (Chapter II) dated Sep. 17, 2020 from PCT Application No. PCT/AU2019/050595.
(Continued)

*Primary Examiner* — James M Anderson, II
(74) *Attorney, Agent, or Firm* — Innovation Capital Law Group, LLP; Vic Lin

(57) ABSTRACT

A vehicle camera telemetry system has a remotely mountable camera apparatus which has a stem having a magnet for magnetic affixation to a metallic body of a vehicle in use. The apparatus further comprises a camera device connected from the distal end of the stem by an adjustable coupling. The stem may further be telescopic for length adjustment so as, for example, extend the length of the stem from less than 22 cm to greater than 29 cm. The camera device has an image sensor and a wireless transmitter for transmitting image data obtained therefrom to a connected mobile device using a wireless connection, such as Wi-Fi or Bluetooth. As such, in use, the camera apparatus may be affixed to various parts of a vehicle and/or an associated trailer, caravan or the like.

22 Claims, 5 Drawing Sheets

(51) Int. Cl.
*G06T 7/90* (2017.01)
*G06T 7/70* (2017.01)
*B60D 1/24* (2006.01)
*B60D 1/36* (2006.01)
*B60R 1/00* (2022.01)
*B60R 11/04* (2006.01)
*G06T 7/20* (2017.01)
*H04N 5/225* (2006.01)
*H04N 7/18* (2006.01)
*B60R 11/00* (2006.01)

(52) U.S. Cl.
CPC ............... *B60R 1/00* (2013.01); *B60R 11/04* (2013.01); *G06T 7/20* (2013.01); *G06T 7/50* (2017.01); *G06T 7/70* (2017.01); *G06T 7/90* (2017.01); *H04N 5/2252* (2013.01); *H04N 5/2256* (2013.01); *H04N 5/232941* (2018.08); *H04N 7/183* (2013.01); *B60R 2011/004* (2013.01); *B60R 2011/0057* (2013.01); *B60R 2011/0084* (2013.01); *B60R 2300/808* (2013.01); *G06T 2207/10024* (2013.01); *G06T 2207/10028* (2013.01); *G06T 2207/30252* (2013.01)

(56) References Cited

U.S. PATENT DOCUMENTS

| | | | |
|---|---|---|---|
| 2006/0098094 A1 | 5/2006 | Lott | |
| 2007/0216136 A1* | 9/2007 | Dietz | B60D 1/36 280/477 |
| 2009/0002487 A1 | 1/2009 | Poulin | |
| 2009/0040300 A1* | 2/2009 | Scribner | H04N 5/23293 348/143 |
| 2013/0038731 A1* | 2/2013 | Brey | B60R 11/04 348/148 |
| 2016/0070154 A1* | 3/2016 | Lai | G03B 17/561 396/428 |
| 2016/0288601 A1* | 10/2016 | Gehrke | G06K 9/6201 |
| 2018/0154513 A1* | 6/2018 | Kou | H04R 1/028 |

OTHER PUBLICATIONS

International Search Report & Written Opinion dated Aug. 1, 2019 from PCT Application No. PCT/AU2019/050595.

* cited by examiner

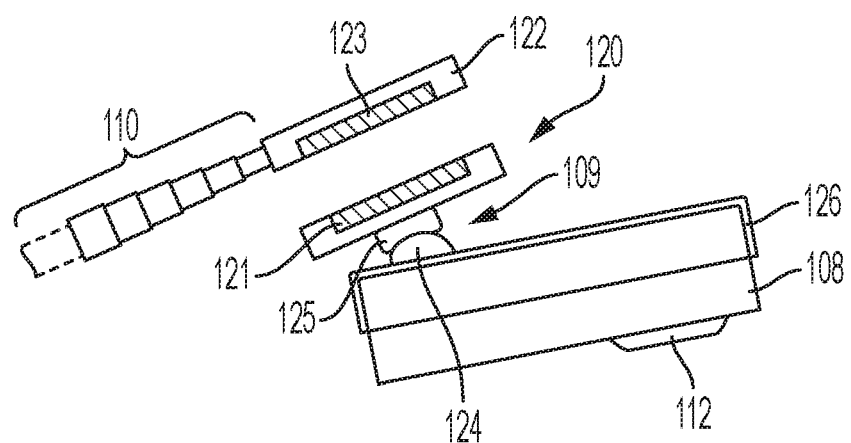
FIG. 3
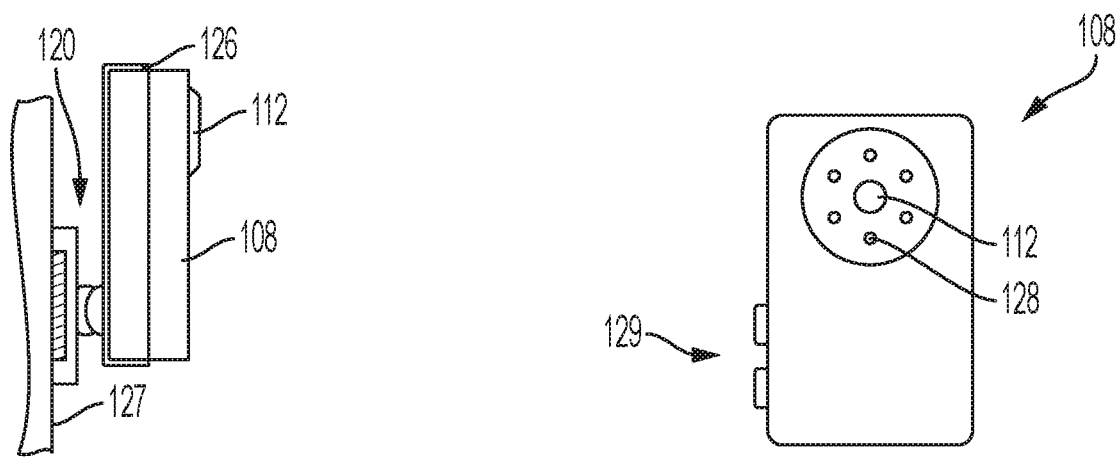
FIG. 4
FIG. 5

VEHICLE CAMERA TELEMETRY SYSTEM

FIELD OF THE INVENTION

This invention relates generally to vehicle camera systems including reversing camera systems. More particularly, this invention relates to a vehicle camera telemetry system comprising a remotely mountable camera apparatus which can be mounted to surfaces of the vehicle and/or trailers/caravans to monitor aspects thereof, including when hitching, reversing and the like.

BACKGROUND OF THE INVENTION

Reversing vehicle camera systems generally comprise a camera mounted at the rear of the vehicle and a digital display at the driver console configured for displaying image data obtained therefrom. As such, in use, the driver may reverse the vehicle whilst avoiding obstacles.

The present invention seeks to provide a system, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a vehicle camera telemetry system comprising a remotely mountable camera apparatus.

The camera apparatus has a stem having proximal and distal ends. The proximal end has a magnet for magnetic affixation to a metallic body of a vehicle in use. The magnet may have a planar fastening face substantially perpendicular to an elongate axis of the stem such that, when affixed to the metallic body in use, the stem stands substantially perpendicularly therefrom.

The magnet may be retained within a widened base such that, for example, the face of the widened base may be wider than 2 cm to provide sufficient purchase despite leverage applied by the stem thereto.

The apparatus further comprises a camera device connected from the distal end of the stem by an adjustable coupling. The adjustable coupling may be configured for adjusting the angle of the camera device with respect to the stem such as through at least 90° and, through 180° in accordance with a preferred embodiment.

The stem may further be telescopic for length adjustment so as, for example, extend the length of the stem from less than 22 cm to greater than 29 cm.

The camera device has an image sensor and a wireless transmitter for transmitting image data obtained therefrom to a connected mobile device using a wireless connection, such as Wi-Fi or Bluetooth.

As such, in use, the camera apparatus may be affixed to various parts of a vehicle and/or an associated trailer, caravan or the like.

For example, for hitching assistance, the camera apparatus may be affixed to the rear door of the vehicle by the magnet. The telescopic extendable portion may be extended such that the camera extends past any obstacles such as spare wheels and the adjustable coupling orientated such that the image sensor of the camera device faces towards the tow ball of the vehicle. As such, the user may then drive the vehicle whilst viewing the digital display of the connected mobile device to view the remote view of the tow ball so as to guide the tow ball towards the hitch of the trailer.

The camera apparatus may be affixed to other portions of the vehicle and/or trailer for other driver assistance, such as rock hazard clearance, tree branch hazard clearance and the like. Yet further the camera apparatus may be affixed to the rear of the trailer so as to guide the reversing thereof.

The wireless interface between the camera device on the mobile device may have a range of 20 m or more so as to have a wide variety of application in tow hitch assistance, reversing assistance and the like.

In embodiments, the camera apparatus comprises a suction cup for affixation to nonmetallic parts of the vehicle such as windscreens. The suction cup may interface over the magnet for dual utilisation purposes.

In further embodiments, the camera device comprises an IR LEDs for nightvision assistance.

The mobile device may execute a software application for implementing the various functionality of the system including having a connection controller allowing the connection of the mobile device to one or more camera devices so as to allow for the simultaneous or alternative display of image data obtained respectively therefrom.

The mobile device may further comprise a display controller configured for displaying an interface comprising the image data obtained from the image sensor of the camera device on a digital display of the mobile device.

The interface may comprise image adjustment control is such as for pan, tilt and zoom control. Such image manipulation may be performed by the mobile device digitally. In alternative embodiments, the camera device comprises an actuator configured to adjust the adjustable coupling such that the actuator is able to tilt or rotate the camera device with respect to the stem and/or adjust a lens of the image sensor to zoom.

In embodiments, the camera device may comprise a proximity sensor to warn of proximate objects, such as when reversing.

In further embodiments, the mobile device may comprise a tracking controller to implement image recognition to track the respective positions of the tow ball and the tow hitch during hitching. In embodiments, the tracking controller may track the trajectory of the tow ball with respect to the tow hitch so as to issue driver instructions to guide the tow ball towards the tow hitch.

In embodiments, the camera device may comprise a camera base having a magnet therein which attaches to a distal end of the stem. As such, the camera base may be connected to the stem where extension is required or alternatively affixed directly to the metallic body of the vehicle.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIGS. 3 and 4 show an embodiment wherein the camera device of the camera apparatus may be alternatively affixed to the stem or directly to the metallic body of a vehicle;

FIG. 5 shows a face of the camera device in accordance with an embodiment;

DESCRIPTION OF EMBODIMENTS

Figure 1:
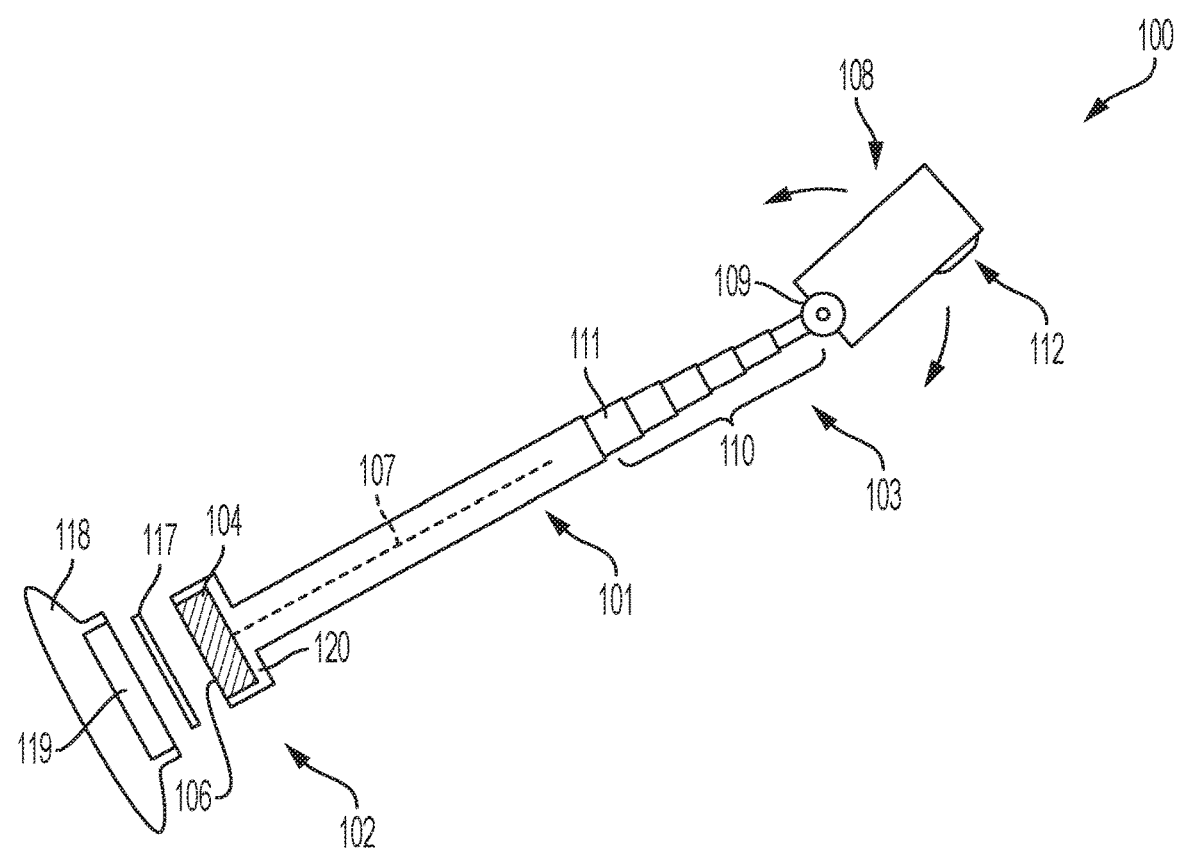
FIG. 1 shows remotely mountable camera apparatus in accordance with an embodiment.
Figure 2:
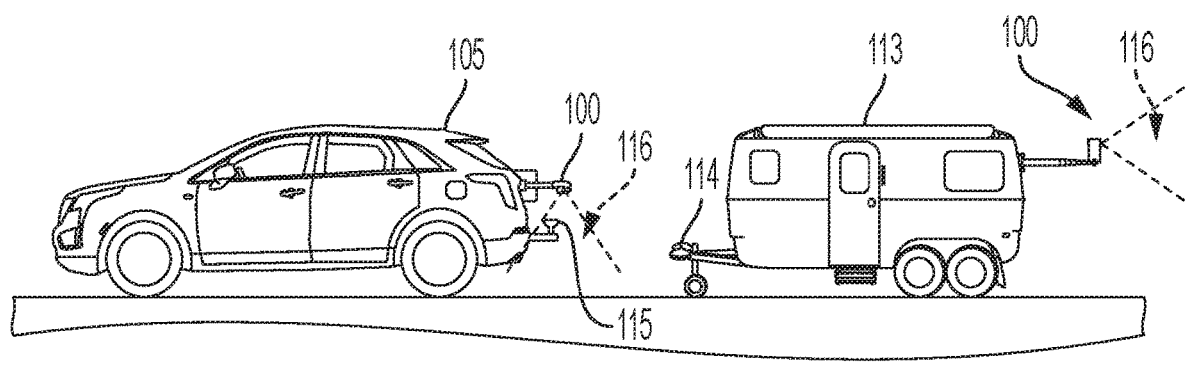
FIG. 2 illustrates exemplary utilisation of the camera apparatus.

FIG. 1 shows a remotely mountable camera apparatus 100. The camera apparatus 100 comprises a stem 101 having a proximal end 102 and a distal end 103. The proximal end 102 has a magnet 104 for magnetic affixation to a metallic body of a vehicle 105 in use. The magnet 104 has a fastening face 106 substantially perpendicular to an elongate axis 107 of the stem 101 such that when affixed to the metallic body in use, the stem 101 stands substantially perpendicularly therefrom as is illustrated in FIG. 2.

In a preferred embodiment, the magnet 104 is retained within a widened base 120 which allows sufficient width of the magnet 104 for purchase against leverage applied by the stem 101 thereon. The widened base 120 may be cup-shaped have a recess therein within which the magnet 104 is affixed. In embodiments the widened base and/or the face 106 of the magnet may be wider than 1 cm but, in a preferred embodiment, wider than 2 cm.

The apparatus 100 further comprises a camera device 108 connected from the distal end 103 of the stem 101 by an adjustable coupling 109. The adjustable coupling 109 is configured for adjusting the angle of the camera device 108 through at least 90° but, in a preferred embodiment through 180°.

A distal portion of the stem 101 comprises a telescopic extendable portion 110 for extension of the length of the stem 101. The extendable portion 110 may comprise a plurality of coaxial and slidably engaged telescopic members 111.

The extendable portion 110 may be configured to extend the stem 101 by 8 cm or more. In one embodiment the stem 101 comprises a length of between 17 and 22 cm when retracted and a length of between 29 and 35 cm when extended.

In embodiments, the apparatus 100 may comprise a protective pad 117, such as of felt, to interface protectively between the magnet 104 and the body of the vehicle in use.

In embodiments, a suction cup 180 may be fixed to the proximal end 102 of the stem 101 for suction attachment to the vehicle, such as to a windscreen. The suction cup 108 may comprise a recess 119 within which the base 120 is held and engaged.

In alternative embodiments, the suction cup 118 may comprise a magnet (not shown) therein which magnetically attracts the magnet 104 of the stem 101.

The camera device 108 comprises an image sensor 112 at a side of the camera device 108. The camera device 108 may further comprises a wireless transmitter therein for transmitting image data obtained from the image sensor 112 to a connected mobile device.

FIG. 2 illustrates the utilisation of the remotely mountable camera apparatus 100 for guidance when hitching a trailer, caravan or the like 113 comprising a tow hitch 114 to a tow ball 115 of a vehicle 105.

As can be seen, the camera apparatus 100 may be magnetically affixed to a rear door of the vehicle 105 and orientated such that the view 116 of the image sensor 112 of the camera device 108 is of the tow ball 115. As can be seen, the stem 101 of the apparatus 100 extends the camera device 108 thereof past obstruction such as spare wheels and the like, providing the camera device 108 with a clear view of the tow ball 115 and hitch 114.

A mobile device (such as a smart phone device) may be connected or paired to the camera device 108 such that the image data obtained from the image sensor 112 of the camera device 108 may be displayed on the digital display of the mobile device. As such, the user may sit within the driver seat and view the view of the tow hitch 114 and tow ball 115 on the digital display of the mobile device. Once hitching is complete, the camera apparatus 100 may be removed and stowed for subsequent use.

The camera apparatus 100 may be easily affixed to other parts of the vehicle and the trailer 113. For example, in FIG. 2, there is shown the camera apparatus 100 affixed to the rear of the trailer 113. The adjustable coupling 109 is configured such that the camera device 108 is orientated substantially perpendicular with respect to the elongate axis 107 of the stem 101 such that the view 116 thereof is rearward. In this manner, the apparatus 100 may be yet further applied to other parts of the vehicles, such as, for example, the front region of the vehicle 105 for viewing rock hazards whilst driving, atop the trailer 113 for viewing branch hazards and the like.

In embodiments, a plurality of camera devices 100 may be connected to a single mobile device such that image data obtained therefrom can be viewed alternately or simultaneously on the same digital display thereof.

In embodiments, the camera device 108 may comprise a wireless router which sets up a Wi-Fi network with a particular Service Set Identifier (SSID). As such, using the mobile device, the user may connect to the Wi-Fi network using the known SSID to establish communication between the mobile device and the camera device 108.

FIG. 3 illustrates an embodiment wherein the camera device 108 is held from a camera base having a magnet 121 therein. The distal end 103 of the stem 101 may comprise a stem base 122 similarly comprising an oppositely polarised magnet 123 or metal plate therein which attracts the magnet 121 of the camera base 120.

The camera device 108 may interface with the camera base 120 by way of an adjustable coupling 109 comprising a universal ball 124 and socket 125 joint such that the orientation angle of the camera device 108 may be adjusted with respect to the camera base 120. In embodiments, the camera device 108 is retained within a cradle 126 which may clip or otherwise releasably engage around the rear and periphery of the body of the camera device 108. The cradle 126 may allow the camera device 108 to be removed for storage, recharging and the like.

As such, the manner shown in FIG. 3, the camera base 120 may be connected to the stem base 122 for utilisation in applications where the stem 101 is required. However, where the extension of the stem 101 is not required, the camera base 120 may be affixed directly to the metallic body 127 of the vehicle 105 or trailer 113.

Figure 8:
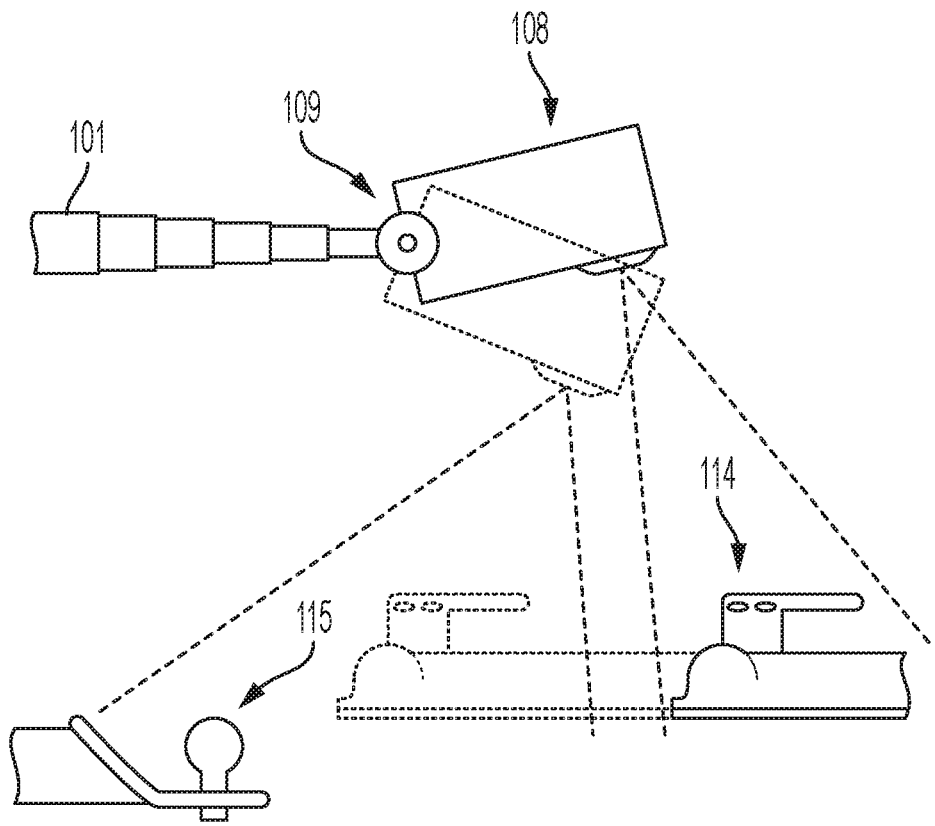
FIG. 8 illustrates the adjusting of the tilt of the camera device to follow a hitch towards a tow ball.

FIG. 8 illustrates a front view of the camera device 108 comprising the image sensor 112. In embodiments, the image sensor 112 may be aided by infrared emitting LEDs 128 for low light level application. The infrared emitting LEDs 128 may illuminate automatically in low light situations. The camera device 108 may further comprise user interface buttons 129 for the operation of the camera device 108 including for the powering on of the device and the connection and/or pairing with a mobile device.

Figure 6:
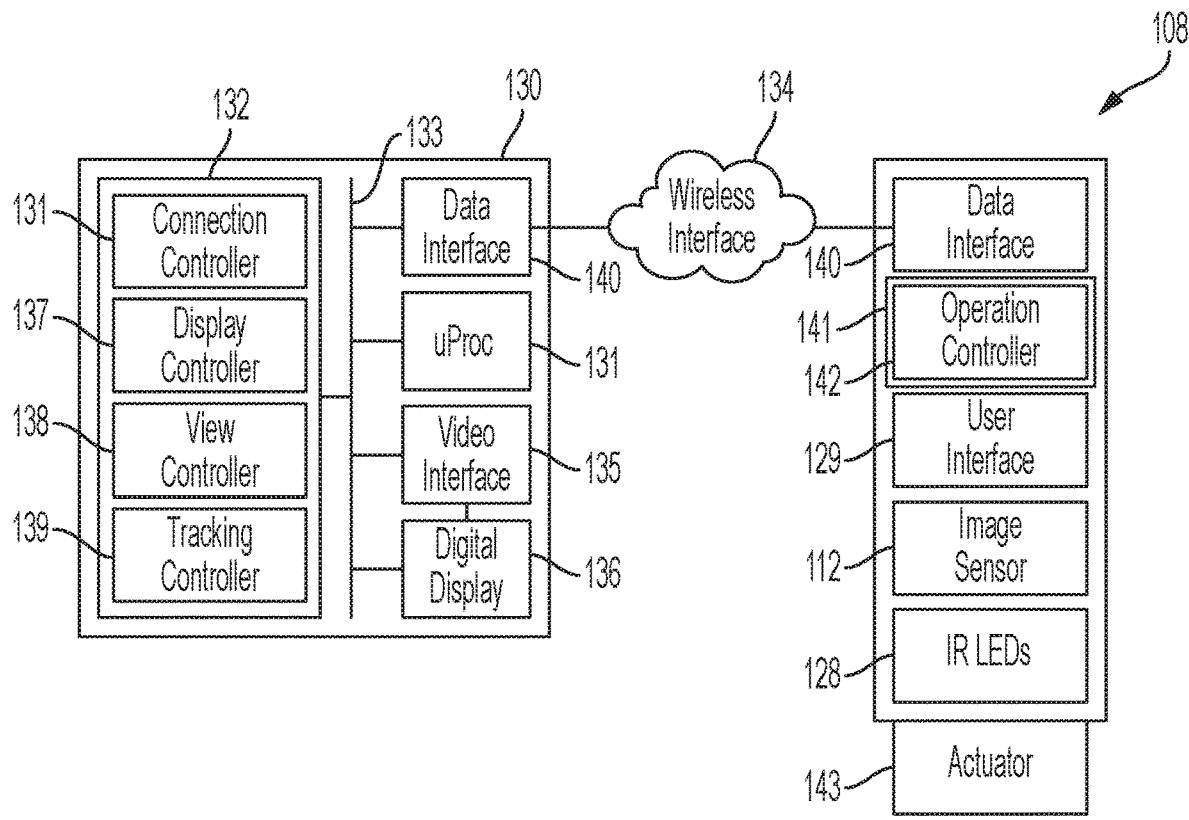
FIG. 6 shows the interconnection of the camera device and a mobile device in accordance with an embodiment.

FIG. 6 illustrates the operable interconnection of the camera device 108 and a mobile device 130. As alluded to above, the mobile device 130 may take the form of a smartphone device and, in this regard, comprises a microprocessor 131 for processing digital data. The mobile device 130 may further comprise a memory device 132 for storing digital data including computer program code instructions. In use, the microprocessor 131 fetches these computer program code instructions and associated data from the memory device 132 via system bus 133 for interpretation and execution for implement in the various functionality described herein.

The various computer program code controllers may be configured by way of a software application which is downloaded to the mobile device 130.

In this regard, the computer program code controllers may comprise a connection controller 131 configured for connecting the mobile device 132 the camera device 108 across a wireless interface 134 such as a Wi-Fi or Bluetooth interface.

The mobile device 130 may further comprise a video interface 135 for the display of digital data on a digital display 136 thereof. In this regard, the mobile device 130 may comprise a display controller 137 configured for displaying image data obtained from the image sensor 112 of the camera device 108.

The controllers may further comprise a view controller 138 configured for altering the view of the image data from the digital display 136 including by way of pan, tilt and zoom, including by electronic digital image manipulation or alternatively by controlling electronic actuators.

The controllers may further comprise a tracking controller configured for implementing image recognition and object tracking to aid the hitching process and warn of obstacles.

The camera device 108 and the mobile device 130 each comprise a data interface 140 for communicating across a wireless interface 134.

The camera device 108 may comprise firmware 141 having an operation controller 142 encoded therein for controlling the operation of the camera device 108. The camera device 108 may comprise the aforedescribed user interface 129 for the user configuration of the operation thereof and the similarly aforedescribed image sensor 112 and infrared LEDs 128.

In embodiments, the camera device 108 may comprise an actuator 143 for adjusting the adjustable coupling 109 to control at least one of the angle and/or the rotation of the body of the camera device 108 with respect to the stem 101 or camera base 120.

Figure 10:
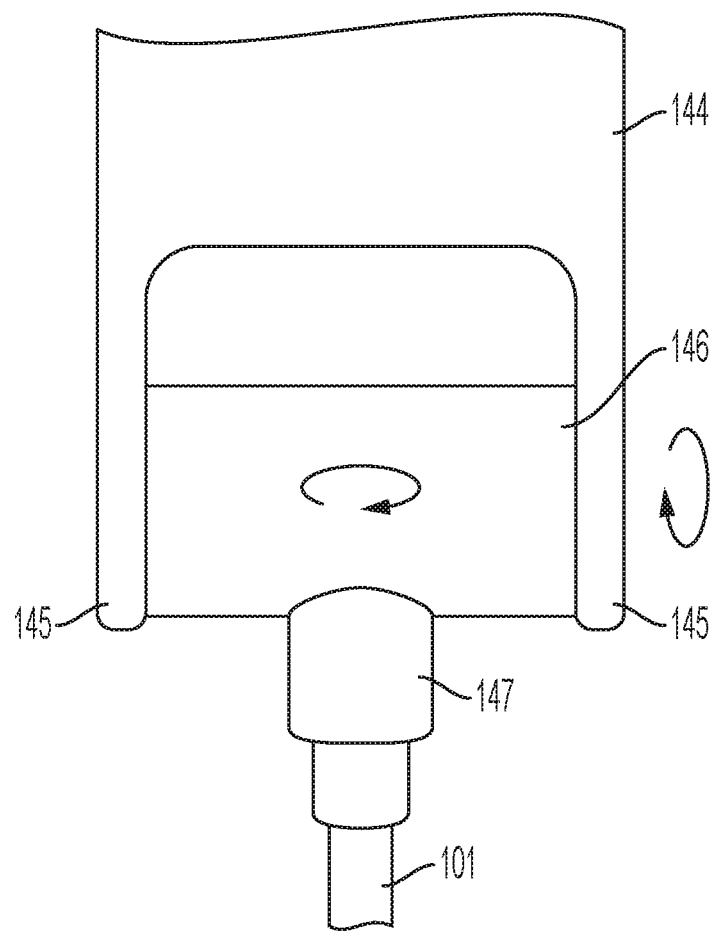
FIG. 10 shows a mechanical couplings configured to adjust the tilt and rotation of the camera with respect to the stem in accordance with an embodiment.

In this regard, and with reference to FIG. 10, in accordance with one embodiment, a camera body 144 comprises flanges 145 which are rotatably engaged by way of a central shaft to a central portion 146 such that the angle of the body 144 can be adjusted by the actuator 143 with respect to the central portion 146 in the manner illustrated. Furthermore, a rotatable collar 147 may engage the stem 101 to the central portion 146 such that the central portion 146 can be rotated by the actuator 143 with respect to the stem 101. As such, with the actuator arrangement of FIG. 10, the angle and rotation of the body 144 of the camera device 108 with respect to the stem 101 may be adjusted by the actuator 143.

Figure 7:
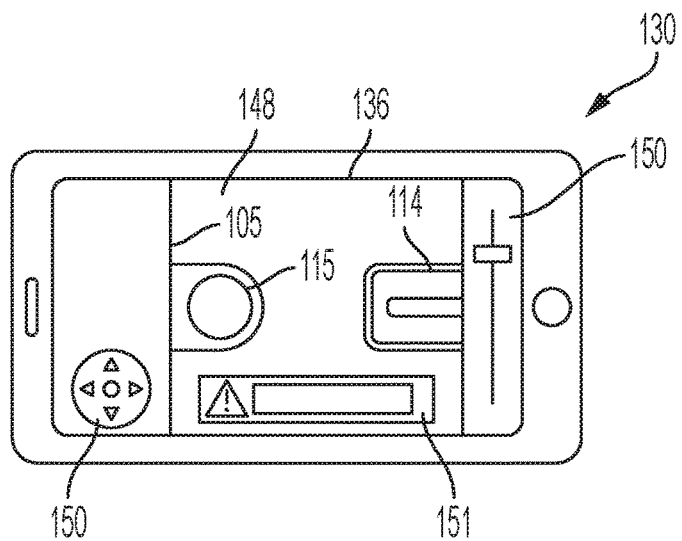
FIG. 7 shows an exemplary interface displayed by the mobile device in accordance with an embodiment.

FIG. 7 illustrates an exemplary interface 148 displayed by the display device 136 of the mobile device 130. As can be seen, the interface 140 and displays image data obtained from the image sensor 112 of the camera device 108 which, in the embodiments shown, shows the view showing the tow ball 115 of the vehicle 105 and the tow hitch 114 of the trailer 113. The interface 148 may comprise a pan rose control 150 to pan the image data shown within the interface 148. As alluded to above, image panning may be digitally implemented wherein, for example, the image data shown within the interface 108 is a subset region of the entire view 116 of the image sensor 112 or alternatively mechanically implemented by the actuator 143 such as using the mechanical coupling of FIG. 10.

The interface 148 may further comprise a zoom control 150 allowing the user to zoom the displayed image data in or out, again either digitally or by mechanical control of a lens of the image sensor 112.

In further embodiments, the interface 148 may comprise a tilt control (not shown) allowing the user to adjust the tilt of the camera device 108. In yet further embodiments, the interface 148 may comprise a rotation control (not shown) allowing the user to control the rotation of the camera device 108 with respect to the stem 101.

In this regard, the communication between the mobile device 130 and the camera device 108 may be bidirectional across the wireless interface 134 such that when using the on-screen controls of the interface 148, control instructions may be transmitted to the camera device 108 via the wireless interface 134 from the mobile device for control of the actuator 143, control of the infrared LEDs 128 or the like.

As such, and with reference to the example of FIG. 8, as the tow hitch 114 approaches the tow ball 115 of the vehicle or vice versa, the user may use the on-screen controls to control the actuator 143 to adjust the adjustable coupling 109 such that, for example, the camera 108 tilts appropriately to view the approach of the hitch 114 to the tow ball 115.

In embodiments, the camera device 148 may comprise a proximity sensor such as an acoustic echolocation proximity sensor (not shown). As such, in addition to transmitting image data to the mobile device 130, the camera device 108 may transmit proximity data indicative of proximate object. As such, for example, with reference to FIG. 2, the camera apparatus 100 mounted to the rear of the trailer 130 may sense distance to rearward objects, such as trees, building structures and the like. In this regard, the view controller 138 of the mobile device 130 may monitor the proximity data obtained from the camera device 108 and display a warning icon 151 and an appropriate message accordingly when an object comes too close.

In embodiments, the tracking controller 139 may perform image recognition on image data obtained from the image sensor 112 for automated guidance assistance.

Figure 9:
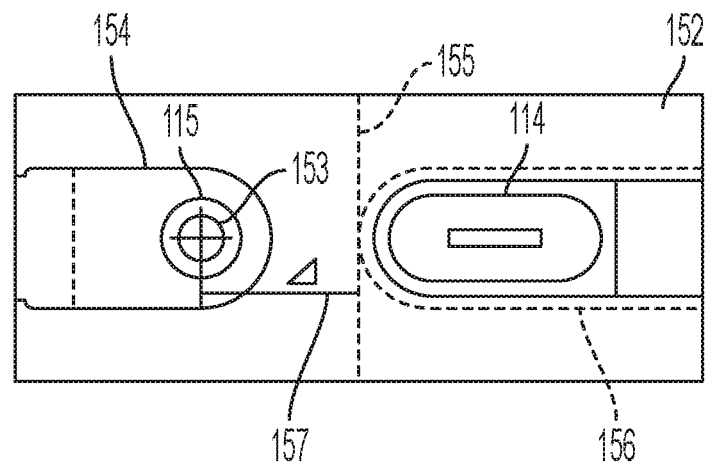
FIG. 9 illustrates image tracking to detect respective positions of a tow ball with respect to a tow hitch.

With reference to the exemplary embodiment of FIG. 9, within the image data 152 obtained from the image sensor 112, the tracking controller 139 may identify a target location 153 of the tow ball 115. In embodiments, the tracking controller 139 may implement shape recognition so as to be able to detect a generally rounded object (indicative of the shape of the tow ball 115) within the image data 152. The target location 153 may be specified as XY coordinates within the pixel map of the image data 152.

In alternative embodiments, the tracking controller 139 may employ colorimetric differentiation to identify the target location 153 of the tow ball 115. In this regard, the tracking controller 139 may ascertain the distinctive colour of the tow ball 115, or the region bounded by the distinctive colour of the surrounding tow ball support plate 154. In alternative embodiments, the user may place a coloured sticker atop the tow ball 115 or the support plate 154, the colour of which is detected by the tracking controller 139.

In a similar manner, the tracking controller 139 may ascertain the proximal edge 155 of the hitch 114. In alternative embodiments, the tracking controller 139 may detect motion within the image data 152 by analysing success image frames so as to detect a bounding region 156 of moving pixels within the image data 152 indicative of the movement of the hitch 114 with respect to the statically affixed camera device 108. Having identified the bounding region 156 of the moving pixels within image data 152, the tracking controller 139 may be able to detect the leading edge 155 thereof.

As such, having detected the target location 153 of the tow ball 115 and the leading edge 155 of the hitch 114 (or target location of the hitch 114), the tracking controller 139 may determine the offset distance 157 between the tow ball 115 and the hitch 114.

As such, when the leading edge 115 approaches too close to the target location 153, the warning 151 may be displayed within the interface 148. In alternative embodiments the mobile device 130 may output an audible cue via an audio output device.

In further embodiments, the tracking controller 139 may provide instructions to guide the trajectory of the tow ball 115 or the hitch 114. In accordance with this embodiment, the tracking controller 139 may determine the lateral offset or alternatively the travel vector of the hitch 114 with respect to the target location 153 of the tow ball.

As such, the mobile device 130 may be configured for outputting driving instructions to correctly align the tow ball 115 with the hitch 114.

For example, on-screen alert 151 may instruct the driver to turn left or right to correctly align the tow ball 115 with the hitch 114. In alternative embodiments, the on-screen display may instruct the driver as to the rotation direction and degree of the steering wheel to correctly align the tow pole 115 with the hitch 114, taking into account the opposite steering when reversing the vehicle 105.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A system comprising remotely mountable camera apparatus, the camera apparatus comprising:

a stem having a proximal end and a distal end;

a magnet at the proximal end for magnetic affixation to a metallic body of a vehicle during use of the system, the stem having a first portion extending linearly from the proximal end defining a first length, the stem having a second portion extending linearly from and formed integrally with the first portion, the second portion defining a second length, the first portion and the second portion defining an elongate axis of the stem, the first length and the second length defining an overall length of the stem;

a planar fastening face of the magnet being substantially perpendicular to the elongate axis of the stem such that when affixed to the metallic body, the stem stands substantially perpendicularly therefrom;

a camera device;

an adjustable coupling at the distal end of the stem, the adjustable coupling configured for adjusting an angle of the camera device with respect to the stem through at least 90°; and a telescopic extendable portion at the second portion of the stem, the telescopic extendable portion extending the second length of the stem, the camera device having an image sensor and a wireless transmitter for transmitting image data obtained therefrom to a connected mobile device.

2. A system as claimed in claim 1, wherein the magnet is retained within a widened base at the proximal end and wherein the magnet has a diameter greater than 2 cm.

3. A system as claimed in claim 1, wherein the stem has a length of less than 22 cm when retracted and a length of greater than 29 cm when extended.

4. A system as claimed in claim 1, wherein the camera device interfaces the distal end of the stem by way of a camera base having a magnet therein such that the camera base may similarly alternatively affix directly to the metallic body in use.

5. A system as claimed in claim 4, further comprising an adjustable coupling between the camera base and the camera device.

6. A system as claimed in claim 4, further comprising a cradle releasably retaining the camera device therein.

7. A system as claimed in claim 4, wherein the distal end of the stem comprises at least one of a magnet of opposite polarity and a metallic plate for attachment to the magnet of the camera base.

8. A system as claimed in claim 1, wherein the camera comprises a plurality of infrared emitting light emitting diodes (LEDs).

9. A system as claimed in claim 1, further comprising a suction cup affixable to the proximal end.

10. A system as claimed in claim 1, further comprising the mobile device, the mobile device comprising a connection controller configured for establishing communication with the camera device via a wireless interface and a display controller configured to display the image data within an interface of a digital display thereof.

11. A system as claimed in claim 10, wherein the interface comprises an image adjustment control for adjusting at least one of the pan, zoom and tilt of the image data displayed within the interface.

12. A system as claimed in claim 11, wherein the mobile device is configured for digital image adjustment in accordance with user interactions of the image adjustment control.

13. A system as claimed in claim 11, further comprising an actuator acting on the adjustable coupling, the actuator configured for adjusting the adjustable coupling to adjust at least one of the tilt and rotation of the camera body with respect to the stem and wherein the mobile device is configured for sending actuator instructions in accordance with user interaction of the image adjustment control to the actuator.

14. A system as claimed in claim 13, wherein the adjustable coupling comprises a central portion rotatably engaging side flanges of a camera body housing either end thereof via a shaft and wherein the actuator is configured for rotating the shaft.

15. A system as claimed in claim 14, wherein the adjustable coupling further comprises a rotatable collar interfacing the central portion, wherein the actuator is configured for rotating the rotatable collar with respect to the central portion.

16. A system as claimed in claim 1, wherein the camera device further comprises a proximity sensor and wherein, in use, the camera device is configured for sending proximity sensor data indicative of a distance between the camera device and an object across a wireless interface to the mobile device and wherein the mobile device comprises a tracking controller configured for monitoring the distance and generating a warning when the distance falls beneath a distance threshold.

17. A system as claimed in claim 1, wherein the mobile device further comprises a tracking controller configured for performing image recognition on the image data for identifying respective positions of a tow ball and hitch within the image data.

18. A system as claimed in claim 17, wherein the tracking controller is configured for implementing object shape recognition for detecting the respective positions.

19. A system as claimed in claim 17, wherein the tracking controller is configured for implementing colorimetric recognition for detecting the respective positions.

20. A system as claimed in claim 17, wherein the tracking controller is configured for detecting motion between successive frames of the image data to identify the respective positions.

21. A system as claimed in claim 17, wherein the tracking controller is configured for generating driving instructions in accordance with the respective positions of the tow ball and hitch.

22. A system as claimed in claim 21, wherein the driving instructions comprise at least one of steering wheel rotation direction and degree.

* * * * *